J. BIGGS.
TIRE SUPPORT.
APPLICATION FILED OCT. 9, 1917.

1,292,687.

Patented Jan. 28, 1919.

WITNESSES

INVENTOR
John Biggs,
BY
ATTORNEY

UNITED STATES PATENT OFFICE.

JOHN BIGGS, OF FORT LAUDERDALE, FLORIDA.

TIRE-SUPPORT.

1,292,687.

Specification of Letters Patent. Patented Jan. 28, 1919.

Application filed October 9, 1917. Serial No. 195,582.

*To all whom it may concern:*

Be it known that I, JOHN BIGGS, a citizen of the United States, residing at Fort Lauderdale, in the county of Broward and State of Florida, have invented a new and useful Tire-Support, of which the following is a specification.

The invention relates to a tire support and more particularly to the class of tire holders for use on automobiles.

The primary object of the invention is the provision of a holder of this character, wherein a plurality of extra pneumatic tires can be conveniently carried upon the automobile, secure from thieves, and also will be rigidly held to avoid displacement when carried on the automobile.

Another object of the invention is the provision of a support or holder of this character, wherein the construction is novel in form, so that the holder can be conveniently placed upon the automobile for detachably carrying several tires upon the running board of said automobile.
A further object of the invention is the provision of a tire support or holder of this character, wherein the keepers for the tires are in the form of double hooks for embracing said tires, and said keepers are detachably secured to the body and running board of the automobile to hold and secure the tires upon the latter, one of the keepers being locked to assure safety. The keepers are extremely simple in construction, strong, durable, and can be made of different sizes to accommodate various sizes of tires, and also are inexpensive in manufacture.

With these and other objects in view, the invention consists in the features of construction, combination and arrangement of parts, as will be hereinafter fully described, illustrated in the accompanying drawings, and pointed out in the claims hereunto appended.
In the accompanying drawings:—

Similar reference characters indicate corresponding parts throughout the several views in the drawing.

Figure 1:
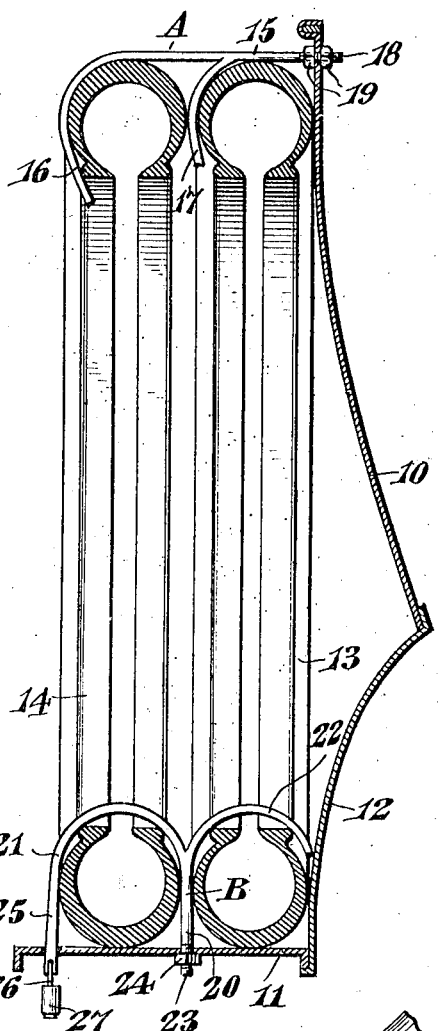
Figure 1, is a vertical sectional view through the running board, a portion of the body of the automobile, and several pneumatic tires, showing the support or holder, constructed in accordance with the invention, applied for the holding and securing of the tires upon the running board.
Figure 2:
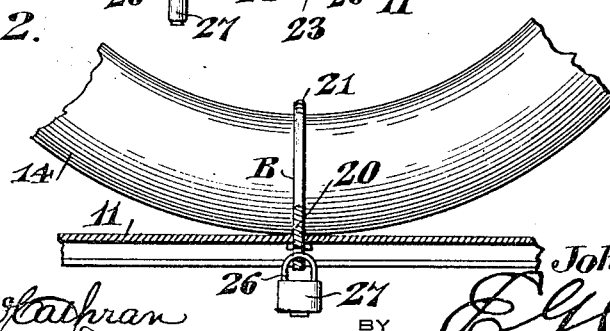
Fig. 2, is a fragmentary vertical longitudinal sectional view through the running board, showing a portion of one tire in elevation with the lower keeper partly broken away to show in detail, the manner of fastening the keeper to the running board for the locking of the tires thereon.

Referring more particularly to the drawing, 10 designates a portion of the body, 11 a portion of the running board, and 12 a portion of the guard for said running board of an automobile, which are of any ordinary well known construction, while located upon the running board, are the front and rear wheel extra pneumatic tires 13 and 14, respectively, which constitutes spares or extra tires intended for use in case of an accident to the tires secured to the vehicle wheels.

The tire support or holder preferably comprises a pair of keepers A and B, respectively, the keeper A being formed with a straight stem or shank 15, which terminates at its outer end in a downwardly and inwardly curved long hook 16, while spaced from the latter is a downwardly and inwardly curved short hook 17. The opposite end of said shank or stem 15, is threaded at 18, on which are engaged jam or lock nuts 19, for the fastening of the keeper A, to the body portion 10, of the automobile, the threaded end 18, being passed through a suitable hole in the body portion 10, at the proper elevation above the running board 11. The nuts 19, are engaged on the threaded end 18, and jam against opposite faces of the body portion for the securing of the keeper A, in position thereon.

The keeper B, comprises a straight shank 20, having at one end reversely extending lateral and downwardly curved long and short hooks 21 and 22, respectively, the shank at its opposite end being threaded at 23, and carrying a nut 24, for the fastening of the shank 20, to the running board 11. The nut of this threaded end 23, is engaged against the under face of the running board, so that the keeper B, is detachably secured thereto. In the hooks 16 and 17, of the keeper A, and in the hooks 21 and 22, of the keeper B, are received front and rear wheel tires 13 and 14, in the position shown in Fig. 1 of the drawing. The long hook 21, of the keeper B, is formed with a straight perforated bill 25, which is adapted to extend beyond the threaded end 23, of the stem or shank 20, for engagement in a suitable hole in the running board 11, and adapted to be engaged in the perforation in said bill 25, is the jaw 26, of a padlock or other lock 27. Thus the keeper B, will be locked to the running board to avoid the theft of the tires 13 and 14, or the surreptitious removal thereof when held in the tire support or holder.

It will be readily apparent to remove the tires 13 and 14, the keeper B is detached from the running board 11, so that said tires may be removed therefrom. In the event of the malicious removal of the keeper A, when the keeper B, is locked, the tires can not be surreptitiously taken from the automobile, as said keeper B, will securely hold the same locked against removal.

It is, of course, to be understood that the keepers can be made of the required sizes to accommodate various sizes of tires, and in this instance the innermost tire 13, is the smaller of the two tires, and as is usual, the smaller tires are adapted for the front wheels, while the larger tires are adapted for the rear wheels of the automobile, so for this reason the keepers are formed with the smaller hooks, and the larger hooks. Yet if desired, the hooks of each keeper can be made of equal sizes, or of proper sizes according to the sizes of the tires to be carried as spares or extras on the automobile.

What is claimed is:—

1. A tire holder comprising a lower keeper having a shank with oppositely extending long and short hooks for engagement with a pair of tires, means for detachably fastening the shank to the running board of an automobile, an upper keeper having a shank for detachable connection with the body of an automobile and formed with depending spaced inwardly curved long and short hooks for engagement with said tires, means for detachably connecting the last named shank to the body of the automobile, and means passing through the running board for locking the lower keeper thereto.

2. A tire holder comprising a lower keeper having a shank with oppositely extending long and short hooks for engagement with a pair of tires, means for detachably fastening the shank to the running board of an automobile, an upper keeper having a shank for detachable connection with the body of an automobile and formed with depending spaced inwardly curved long and short hooks for engagement with said tires, means for detachably connecting the last named shank to the body of the automobile, a bill formed on the long hook of the lower keeper and adapted to be passed through the running board, and a lock for engaging the bill below the running board.

3. In combination with the body and running board of an automobile, an upper keeper having a shank and a pair of long and short curved hooks which are spaced apart, the outer hook being the longer, said shank being provided with threads and carrying nuts by which the keeper is secured to said body in a substantially horizontal position so as to extend across a pair of tires with the short hook fitting between the tires, and a lower keeper having a central straight shank and oppositely bent along and short curved hooks, the outer hook being the longer, both the shank and the outer hook of the lower keeper being passed through the running board, a nut threaded on the end of the shank, and a lock fitted to the end of the outer hook below the running board, said shank fitting between the tires.

In testimony, that I claim the foregoing as my own, I have hereto affixed my signature in the presence of two witnesses.

JOHN BIGGS.

Witnesses:
H. S. SWEETING,
J. L. LEWIS.

Copies of this patent may be obtained for five cents each, by addressing the "Commissioner of Patents, Washington, D. C."